United States Patent [19]

Walley et al.

[11] Patent Number: 4,872,911

[45] Date of Patent: Oct. 10, 1989

[54] STOP LEAK COMPOSITION

[76] Inventors: David H. Walley, 3621 Club Estates Dr. #2, Muskogee, Okla. 74403; Marvin R. DeVries, 3823 S. 99th East Ave., Tulsa, Okla. 74146

[21] Appl. No.: 184,199

[22] Filed: Apr. 21, 1988

Related U.S. Application Data

[63] Continuation-in-part of Ser. No. 947,881, Dec. 30, 1986, abandoned.

[51] Int. Cl.$^4$ .......................... C09K 3/10; E21B 33/00
[52] U.S. Cl. .......................................... 106/33; 252/72; 277/1; 523/221; 524/555
[58] Field of Search ...................... 106/33, 35; 252/72; 277/1; 524/555

[56] References Cited

U.S. PATENT DOCUMENTS

| | | | |
|---|---|---|---|
| 2,885,296 | 5/1959 | Welden | 252/72 |
| 3,630,914 | 12/1971 | Nankee | 252/72 |
| 3,984,507 | 10/1976 | Miller | 252/72 |
| 4,010,231 | 3/1977 | Phillips | 252/72 |
| 4,172,066 | 10/1979 | Zweigle et al. | 252/8.55 D |
| 4,776,888 | 10/1988 | Morrow | 106/33 |

Primary Examiner—Theodore Morris

[57] ABSTRACT

A method of using a particulate matter formed of a tri-dimensional cross-linked superabsorbent hydrogel for stopping leaks in a cooling system of a vehicle. The hydrogel is added to a filled coolant system and the engine is run for a period of time until the leakage stops.

2 Claims, No Drawings

STOP LEAK COMPOSITION

This application is a continuation - in part of application Serial Number 947,881 filed Dec. 30, 1986, now abandoned.

GENERAL DESCRIPTION OF THE INVENTION

This invention relates generally to cooling system stop leak compositions for internal combustion engines and more particular to a method of using a particulate matter of a hydrogel polymer having a bi-modal particle size distribution for eliminating a leak in a cooling system.

Heretofore various types of stop leak compounds have been used to stop water leakage in a crack or rupture in the radiator, engine block or other parts of a cooling system. These stop leak compositions are only useful in stopping minor leaks such as small cracks and holes.

Sometimes there is a need for stopping large leaks which are not stopable by the well known stop leak compounds. The use of a bi-modal particle size distribution is a superior technique of plugging holes or leaks when a high degree of uncertainty exists at knowing the hole diameter distribution. Thus, by using two different size distributions which represent 2-modes of a log-normal characteristic curve increases the probability of effectively plugging all holes.

Holes occurring in automotive cooling systems can range from submicron size which represent seepage leaks up to high flowrate leaks in a ¼ inch diameter range. It is a total probability situation for developing a method and composition to plug these leaks. Thus, there is a degree of uncertainty as to what diameter of leak that can occur. The automotive cooling system leak diameters have been observed and measured and thus the degree of uncertainty is much less than that of considering the "unseen" and unmeasured hole or pore diameters such as formed in subterranean formations as exemplified in the prior art such as U.S. Pat. No. 4,572,295. The present invention overcomes the drawbacks of the well known stop leak compounds by providing a compound and method for stopping small as well as large leaks.

DETAILED DESCRIPTION

The composition of the present invention comprises tridimensional (cross-linked) superabsorbent hydrogels which are added to water which is to be used for a cooling system or added to water already in a cooling system of an internal combustion engine.

Hydrogels of the present invention are any one of those cross-linked hydrophillic polymers that will swell or expand in the presence of an aqueous solution. Examples are cross-linked acrylamide/acrylic acid copolymers having smaller and larger sizes than the hole or crack to be sealed. For sealing a hole in a radiator or a crack in an engine, the hydrogel used is a particulate, tridimensional cross-linked hydrogel polymer having a nonuniform particle geometry such as acicular and/or cuboidal with an aspect ratio of from about 1 to about 10. Particles that are nonspherical are better at plugging leaks or holes because the shape factor increases the bonding friction between particles. The average particle diameter of the hydrogel preferably is selected with reference to the average diameter of the hole or crack to be filled. Thus, the hydrogel polymer used will have particles having an average diameter less than the diameter or width of the leak and also particles having an average diameter greater than the diameter or width of the leak. Selection of the average particle size within the described range assures that particles of hydrogel polymer can become lodged in the leaks and that these leaks will be blocked to water migration once the hydrogel polymer particles become swollen with water. Another fraction of the hydrogel polymer particles may be characterized by an average particle diameter of from between about one and about two orders of magnitude greater than the average permeable leak diameter of the treated leak.

The following table shows the expansion response of this type of super-absorbent in an antifreeze/water mixture.

| Polymer | % glycol/water | expansion ratio (g/g) |
| --- | --- | --- |
| Acrylamide/ | 0 | 215. |
| Acrylate | 20 | 162. |
|  | 40 | 105. |
|  | 60 | 54. |
|  | 100 | nil |

It has been determined that one definite problem encountered using the polymer in a concentrated antifreeze solution, is settling. The absolute specific gravity of the acrylamide copolymers is between 1.25–1.4 g/cc and the glycol is in a range less than 1 g/cc. It has been determined that copolymers as set forth in the prior art have high surface active "adhesive" properties and thus, the composition will settle out and stick to the bottom of the system. Dry hydrogels can be expanded much like polystyrene foam by addition of heat between the range 300°–400° F. for a few minutes cooking time. The temperature and cook time determines the blown density of the polymer. We have successfully created a neutral buoyancy condition in ethylene glycol antifreeze. The blown polymer resembles spheroids. However, on contact with water the particles collapse instantly back to their original shape. This is called shape memory.

This invention may be carried out by the addition of a cross-linked hydrophillic polymer to the water in the cooling system of a vehicle or to the addition of a cross-linked hydrophillic polymer to a container of water which is then added to the cooling system of a vehicle. The addition of a cross-linked hydrophillic polymer to a cooling system of a vehicle will very quickly stop leakage of water from a radiator, from around the water pump shaft, from the engine block (internal and external) and even in cracked hoses as a temporary measure.

The shape of the particle, particle size distribution and concentration of hydrogel polymer/carrier fluid fluxing the leak in the combined mode is the key to the effectiveness of the present invention. The present invention employs the following:

1) a preferred non-uniform particle geometry being acicular, cuboidal platelike particles with an aspect ratio within the range 1–10.

2) A broadband, bi-modal size distribution comprising particles smaller than the pore and particles larger than the pore.

3) A concentration to inhibit or promote particle-particle interactive plugging effects. I.e., the interaction of or collision of 2 or more particles with an individual particle diameter less than the pore sticking together resulting in a composite particle greater than the pore which results in effectively plugging the leak. The present invention promotes particle-particle plugging effects in the leak. The advantage here is that the particles smaller than the pore can log-jam and effectively plug the leak.

It has been determined that for a normal cooling system of an automobile that from one to two grams of a particulate polymer will stop leakage of a small crack or opening in a radiator. For a large crack, larger amounts of polymer are required.

The following are two examples of the use of a crosslinked hydrophillic polymer for stopping leaks in different coolant systems.

EXAMPLE I

A Dodge Omni vehicle developed a severe leak in the water pump. The car was pulled off to the side of the road. No water was available in the nearby vicinity. However, a few gallons of oil formation aqueous brine were in plastic jugs in the back seat. Thus, this water was used expediently to top off the radiator. The engine was restarted and a severe water leak at the seal/pulley shaft interface was observed. About 1-2 grams of polymer were added to the radiator and in about five minutes the leak ceased. The car was driven for about six months with no leaks and then sold.

It would be obvious to one skilled in the art that normally fresh water would be used in an automobile cooling system because of the corrosive effect of salt water. It would be obvious that if the stop leak concentrate was effective in a brine that the same should be effective in fresh water. Thus, it is believed that the example used would also be demonstrative in fresh water.

EXAMPLE II

A 1969 Dodge Coronet 440 had a severe corrosive crack in the top half of the radiator. The crack dimensions were about 16 inches long and 1/64 to 1/32 inch wide in places. When the engine was started, the water leaked from the crack at a rate of about 10 cc/sec. In order to demonstrate the efficiency of the polymers stopping water leaks, 50-100mg of hydrogel was added to the fresh water in the radiator, within 10 minutes the water leak was completely attenuated. The vehicle was driven for about 30 miles, the radiator was opened and found that the fluid level remained constant. The vehicle was driven for about 3-4 months and 1-2 grams of polymer were systematically added to the radiator. Subsequently, it was decided to mechanically fix the radiator. One quart of bleaching solution was added to the water in the radiator and circulated therein. After a few minutes the leak began to appear again at the crack and leaked at about the same rate as prior to treating it with the polymer. The system was then flushed with water, the radiator was removed and soldered.

It is seen from the above two examples that different types and sizes of leaks may be stopped by the use of different amounts of a a polymer added to a leaking cooling system.

It has also been determined that adding large amounts of a polymer to a coolant system of a vehicle is a good way to break the engine block into parts. For example:

Eight ounces of superabsorbent was added to the coolant system of an old junk vehicle while running. Within ten minutes the engine block was completely destroyed. It is believed that the cooling fluid gelled so fast that tremendous thermal stresses were developed throughout the engine block. The block was broken in more than five places.

The present invention takes advantage of a particle-particle interactive plugging effect. This is when all of the stop-leak is dumped into the radiator at once which is described in chemical kinetics as a "plug flow" mechanism. This log-jam phenomenae takes place and is the particle-particle interactive plugging effect. The plug flow effect is when the entire amount of a concentrated form of polymer is added to the water in the radiator at once. The concentration of the polymer is high within the discrete volume of fluid carrying the particles. As the discrete volume flows through the system and encounters a leak greater than the largest particle, many particles are fluxed into the hole at once. This can be visualized by a log-jam in a creek. Each log is much smaller than the width of the creek. However, a sufficient concentration of logs of average length and diameter less than the average creek diameter can plug the creek. The same effect results from dumping the additive all at once.

What is claimed is:

1. A stop leak composition for a cooling system of a vehicle which comprises a tridimensional cross-linked superabsorbent hydrogel particulate polymer having a non-uniform particle geometry such as acicular and/or cuboidal with an aspect ratio of from about 1 to about 10,
   a first particle fraction having an average size less than the average leak size,
   a second particle fraction having particles of an average size about one order of magnitude greater than the average size of the leak,
   said particles having a specific gravity which is from about 1.25 g/cc to about 1.40 g/cc with a blown density which has a neutral buoyancy condition in an ethylene glycol antifreeze.

2. A method for eliminating a leak in a cooling system of a vehicle which comprises:
   forming a tridimensional cross-linked superabsorbent hydrogel particulate polymer having a non-uniform particle geometry such as acicular and/or cuboidal with an aspect ratio of from about 1 to about 10 having a first particle fraction with an average size less than the average leak size,
   a second particle fraction with particles of an average size about one order of magnitude greater than the average size of the leak, with said particles having a specific of gravity which is from about 1.25 g/cc to about 1.40 g/cc with a blown density which has a neutral buoyancy condition in an ethylene glycol antifreeze, adding water or a water glycol mixture into said coolant system to almost fill the system,
   heating said formed particulate to a temperature from about 300° F. to about 400° F. for a few minutes,
   subsequent to heating said formed particulate polymer particles,
   introducing the heated particulate polymer particles into a substantially filled cooling system containing water or a water glycol coolant mixture and circulating the coolant and introduced particulate polymer particles within the cooling system for a period of time until the leak stops.

* * * * *